(12) United States Patent
Moody et al.

(10) Patent No.: US 11,536,143 B1
(45) Date of Patent: Dec. 27, 2022

(54) ENDWALL COOLING SCHEME

(71) Applicants: Rolls-Royce North American Technologies Inc., Indianapolis, IN (US); Rolls-Royce Corporation, Indianapolis, IN (US)

(72) Inventors: Jack Moody, Indianapolis, IN (US); Jerry Layne, Indianapolis, IN (US); Jeffrey F. Rhodes, Indianapolis, IN (US); Brett Barker, Indianapolis, IN (US); Eric Koenig, Indianapolis, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 17/559,803

(22) Filed: Dec. 22, 2021

(51) Int. Cl.
| F01D 5/18 | (2006.01) |
| F01D 9/06 | (2006.01) |
| F01D 25/12 | (2006.01) |

(52) U.S. Cl.
CPC ............... *F01D 5/186* (2013.01); *F01D 9/06* (2013.01); *F01D 25/12* (2013.01); *F05D 2220/32* (2013.01); *F05D 2240/12* (2013.01); *F05D 2240/30* (2013.01); *F05D 2260/202* (2013.01)

(58) Field of Classification Search
CPC . F01D 5/186; F01D 9/06; F01D 25/12; F05D 2220/32; F05D 2240/12; F05D 2240/30; F05D 2260/202
See application file for complete search history.

(56) References Cited

U.S. PATENT DOCUMENTS

| 3,628,880 | A | 12/1971 | Smuland et al. |
| 3,800,864 | A | 4/1974 | Hauser et al. |
| 6,241,467 | B1 | 6/2001 | Zelesky et al. |
| 6,254,333 | B1 | 7/2001 | Merry |
| 7,857,580 | B1 | 12/2010 | Liang |

(Continued)

FOREIGN PATENT DOCUMENTS

WO  WO 2019/030314 A1  2/2019

OTHER PUBLICATIONS

Uzol et al., "Heat Transfer, Pressure Loss and Flow Field Measurements Downstream of a Staggered Two-Row Circular and Elliptical Pin Fin Arrays," May 2005, pp. 458-471, ASME, *Journal of Heat Transfer*, vol. 127, No. 5.

*Primary Examiner* — Eldon T Brockman
(74) *Attorney, Agent, or Firm* — Crowell & Moring LLP

(57) ABSTRACT

An endwall assembly disposed at one end of a vane assembly may comprise an endwall spar that includes an cold side, an hot side, a leading edge, a trailing edge, and an axis extending from the leading edge to the trailing edge perpendicular to the leading edge. The endwall assembly may include a coversheet on the hot side of the endwall spar and a cooling channel that includes a cooling fluid inlet disposed in the endwall spar, and a cooling fluid outlet. The endwall assembly may include a structure protruding from the cold side of the endwall spar, wherein the structure is located between the cooling fluid inlet and the cooling fluid outlet along the axis; and a cooling fluid source cavity on the cold side of the wall, the cooling fluid source cavity in fluid communication with the cooling fluid channel via the cooling fluid inlet.

20 Claims, 8 Drawing Sheets

(56) References Cited

U.S. PATENT DOCUMENTS

| | | |
|---|---|---|
| 8,459,935 B1 | 6/2013 | Liang |
| 8,517,667 B1 | 8/2013 | Liang |
| 9,790,799 B2 | 10/2017 | Tagawa et al. |
| 9,995,157 B2 | 6/2018 | Bangerter |
| 2005/0281663 A1* | 12/2005 | Trindade ................. F01D 9/041 |
| | | 415/1 |
| 2007/0059171 A1* | 3/2007 | Simms ...................... B22C 9/10 |
| | | 416/96 R |
| 2016/0194980 A1 | 7/2016 | Thomen et al. |
| 2017/0234144 A1 | 8/2017 | Mugglestone |
| 2019/0032495 A1* | 1/2019 | Weaver ............... F04D 29/2272 |

\* cited by examiner

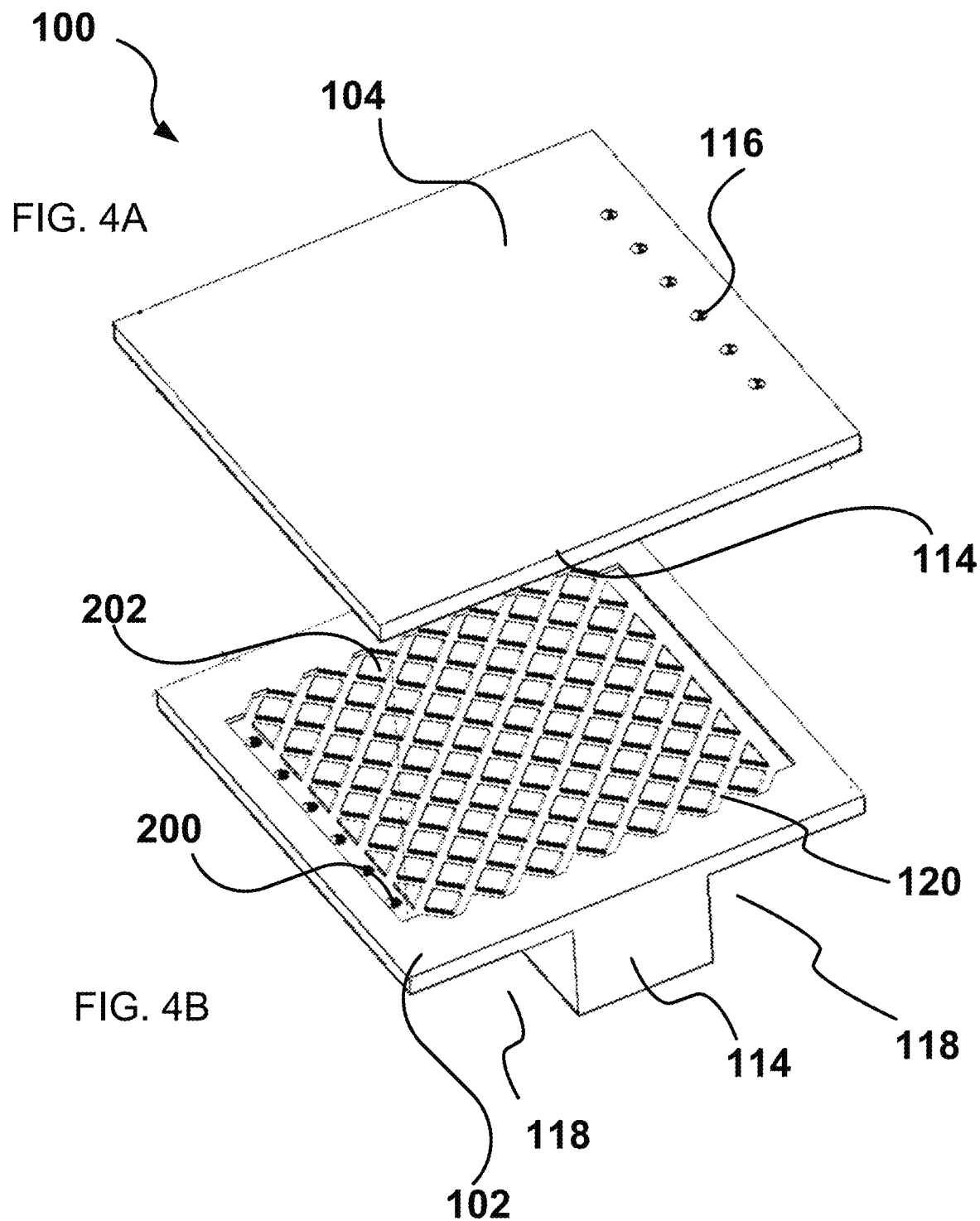

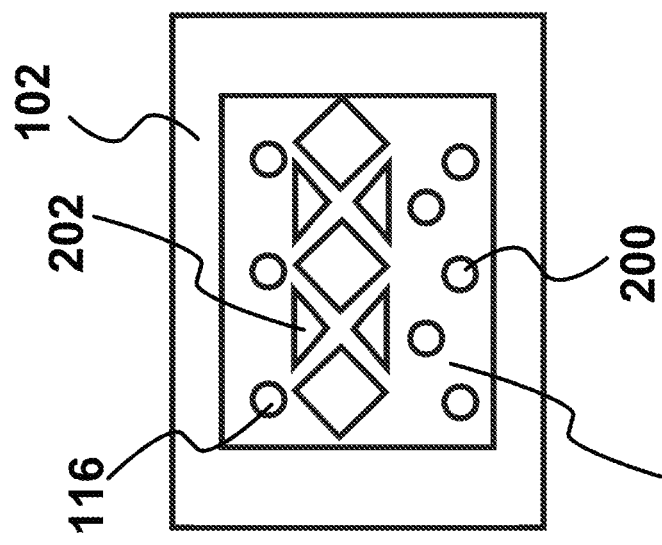
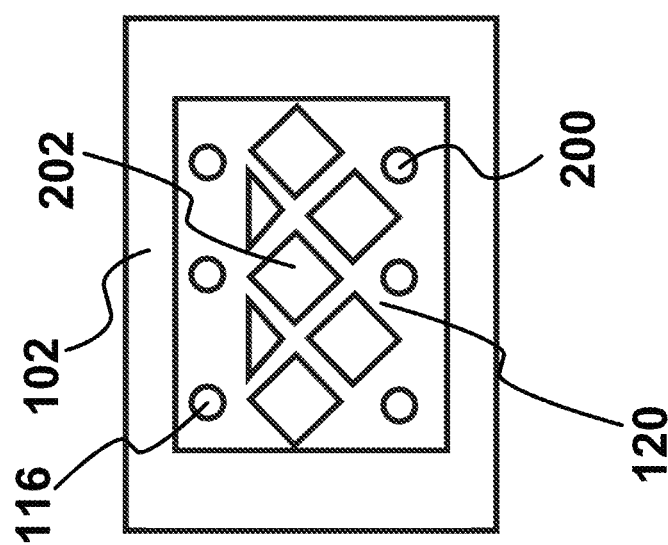
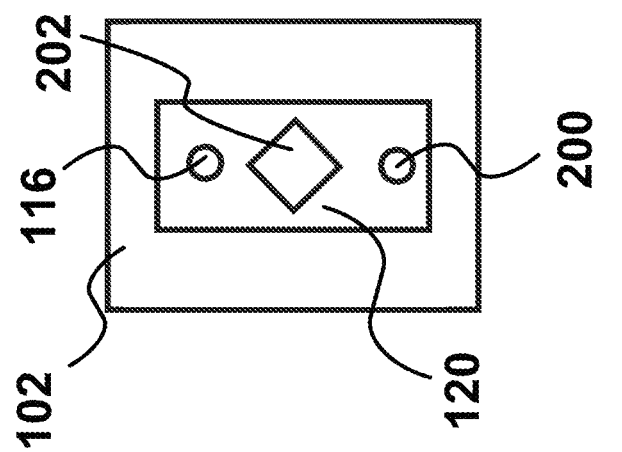
FIG. 5C
FIG. 5B
FIG. 5A

ENDWALL COOLING SCHEME

TECHNICAL FIELD

This disclosure relates to airfoil endwalls and, in particular, airfoil endwall cooling schemes.

BACKGROUND

Present airfoil endwall cooling systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 4A illustrates an example of a portion of an airfoil endwall coversheet;

FIG. 4B illustrates an example of a portion of an airfoil endwall spar;

FIGS. 5A-5C illustrate examples of a portion of an airfoil endwall;

DETAILED DESCRIPTION

Figure 1:
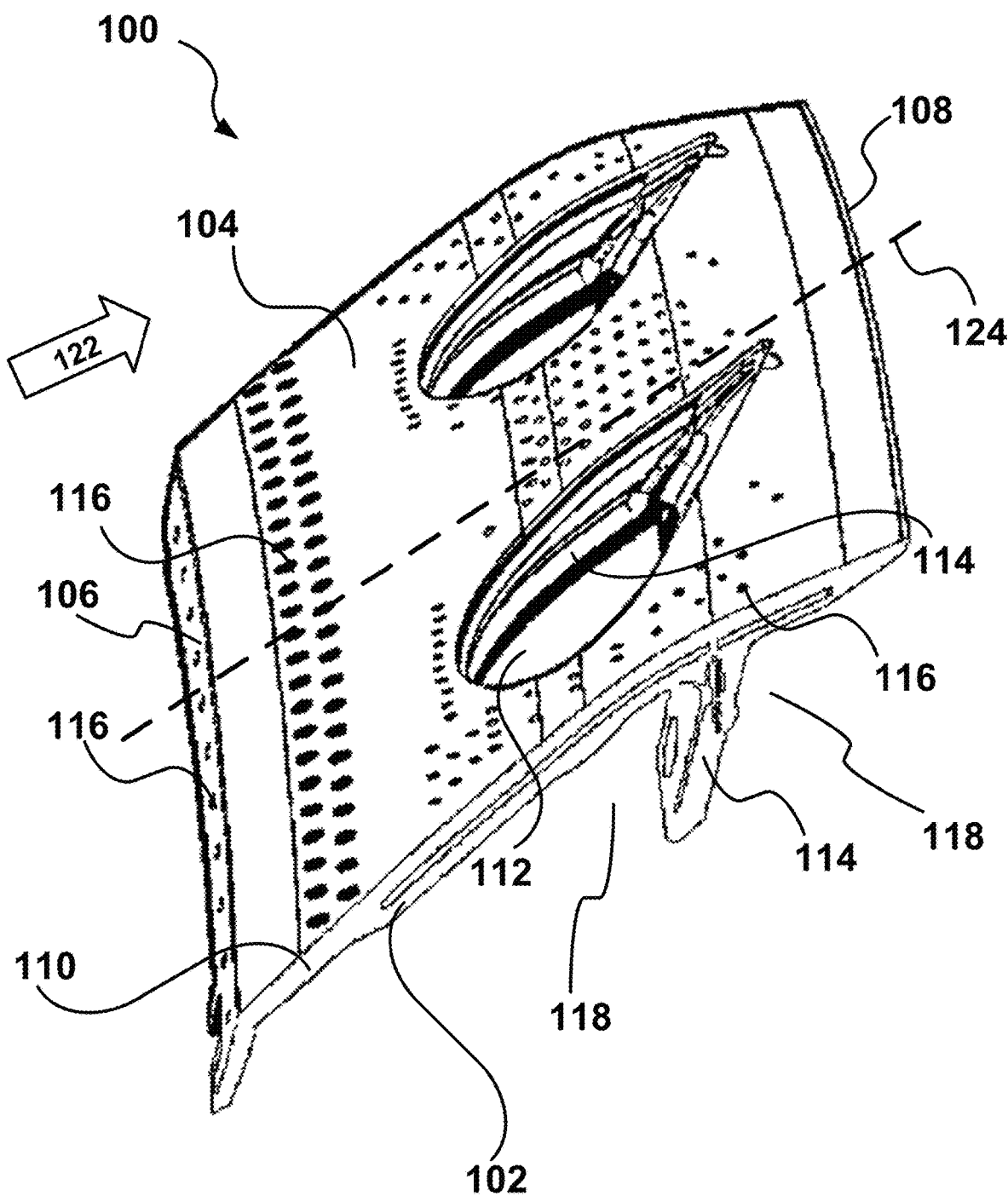
FIG. 1 illustrates an example of an airfoil endwall.

An endwall assembly may be disposed at one end of a vane assembly.

The endwall assembly may comprise an endwall spar and a cover sheet or hot sheet. The endwall assembly, endwall spar, and cover sheet may each include a respective cold side, which is a side or surface of the component that is configured to face away from a main flow of hot gas from, for example, a flow from an upstream combustor, and a respective hot side, which may be opposite the cold side, the hot side being a side or surface configured to be disposed closest to and/or face the main flow. The endwall assembly may further comprise a leading edge, a trailing edge, and/or an axis. The axis may extend from the leading edge to the trailing edge perpendicular to the leading edge. The coversheet may be disposed on the hot side of the endwall and a cooling channel may be disposed between the hot side of the endwall spar and the cold side of the coversheet. The cooling channel may include a cooling fluid inlet disposed in the endwall, and a cooling fluid outlet. The cooling fluid outlet may be disposed at the trailing edge of the endwall. The cooling fluid outlet may be disposed downstream from the cooling fluid inlet. Additionally or alternatively, the cooling fluid outlet may be disposed in the leading edge of the endwall.

The endwall assembly may further comprise a structure protruding from the cold side of the endwall spar, wherein the structure is located between the cooling fluid inlet and the cooling fluid outlet along the axis; and a cooling fluid source cavity on the cold side of the wall, the cooling fluid source cavity in fluid communication with the cooling fluid channel via the cooling fluid inlet.

An assembly of coversheets and spars is merely one method or possible embodiment. Other techniques may be used to manufacture the endwall assembly, for example, such as soluble core or additive layer manufacturing. The terms "spar" and "coversheet" are not intended to limit the manufacturing method that may be used to produce a dual-wall or dual-structured endwall assembly.

One interesting feature of the systems and methods described below may be that dual-wall assembly of the endwall and the coversheet may provide high cooling performance close to the hot surface of the endwall assembly while requiring less cooling fluid than ballistic cooling, which may also be known as combustor trim air, and/or effusion cooling. Alternatively, or in addition, an interesting feature of the systems and methods described below may be that cooling fluid may be provided from a preferable source, for example, from a source with higher pressure, to a downstream outlet that is not near or adjacent to the source. Additionally or alternatively, the outlet may be at an optimum angle and placement without worrying about a nearby cooling fluid source.

Alternatively, or in addition, an interesting feature of the systems and methods described below may be that the pedestals, for example elongated or airfoil shaped pedestals, may be optimized to eject cooling fluid out the outlets at a specific angle and velocity. The pedestals may effect less of a pressure drop as the cooling fluid passes by them and therefore, may deliver more flow of the cooling fluid out the outlet and heavily cool the hot side of the endwall assembly. Additionally or alternatively, the pedestals may be shaped so that the pressure of the cooling fluid exiting the outlets is close to the same pressure or higher as a free stream flow flowing over the outlets.

Alternatively, or in addition, an interesting feature of the systems and methods described below may be that cooling fluid exiting near the leading edge of the endwall assembly may impinge and provide cooling to an upstream, adjacent combustor. The cooling fluid may impinge on the combustor, and flow downstream to film cool the endwall assembly. The angle of the outlets may match the flow coming off of the combustor. Additionally or alternatively, the airflow may be tailored circumferentially to match pressure and temperature variations. The openings or cooling outlets may be designed and varied to match gas path or free stream pressure and temperature variations. Each outlet may be individually tailored and varied in size and location based on the circumferential location of the outlet and its respective endwall assembly in a ring of endwall assemblies and/or airfoil ring of a gas turbine engine. The outlet may be tailored in order to optimize airflow and/or cooling.

FIG. 1 illustrates an example of an endwall assembly 100. The endwall assembly 100 may comprise an endwall spar 102, a coversheet 104, a leading edge 106, a trailing edge 108, sidewalls 110, an airfoil opening 112, blocking structures 114, cooling fluid inlets 200 (shown in FIG. 2), cooling fluid outlets 116, cooling fluid source cavities 118, and cooling fluid channels 120. The leading edge 106 and the trailing edge 108 may refer to the direction of a flow of hot fluid 122, for example, hot gas from an upstream combustor, over the endwall assembly 100. The hot fluid 122, or free stream, may flow from the leading edge 106 to the trailing edge 108. The leading edge 106 may be the edge of the endwall assembly 100 closest to the widest end of the airfoil opening 112. The trailing edge 108 may be the edge of the endwall assembly 100 closest to the narrowest end, or tail, of the airfoil opening 112.

The endwall assembly 100 may be disposed at a circumferentially inner and/or circumferentially outer end of an airfoil, for example, a blade or vane. The coversheet 104 may form an outer wall of the endwall assembly 100, or a wall of the endwall assembly disposed closest to the main flow 122. The endwall spar 102 may form an inner structure of the endwall assembly 100, or a structure of the endwall assembly 100 disposed away from the main flow 122, opposite the coversheet 104. The coversheet 104 may be disposed on top of the endwall spar 102, forming cooling fluid channels 120 between the coversheet 104 and the endwall spar 102. The endwall spar 102 may form the blocking structures 114. The blocking structures 114 may extend out, away from endwall spar 102, for example, the blocking structures 114 may extend away from the endwall spar 102 on the opposite side of the endwall spar 102 from the cooling fluid channels 120. The blocking structures 114 may block cooling fluid source cavities 118 from being in fluid communication with each other. The cooling fluid outlets 116 may be disposed in the coversheet 104. Alternatively or in addition, the cooling fluid outlets 116 may be disposed in the endwall spar 102, for example, in the leading edge 106 and/or the trailing edge 108 of the endwall spar 102. The cooling fluid outlets 116 may be in fluid communication with the cooling fluid channels 120. The airfoil openings 112 may extend through the endwall assembly 100, for example, through the coversheet 104 and the endwall spar 102. A blocking structure 114 may extend around the circumference of the airfoil opening 112. Alternatively, no airfoil opening 112 may be present in the endwall spar 102.

The endwall assembly 100 may be part of an airfoil assembly, for example, a vane assembly or blade assembly. The endwall assembly 100 may be part of a doublet, or airfoil assembly with two airfoils. The endwall assembly 100 may be a dual wall endwall, wherein the coversheet 104 forms a hot wall of the endwall assembly 100 and the endwall spar 102 forms an inner structure of the endwall assembly 100. The endwall assembly 100 may be part of a turbine engine, for example. The turbine engine may be, for example, a gas turbine engine that supplies power to and/or provides propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively, or in addition, the gas turbine engine may be utilized in a configuration unrelated to an aircraft such as, for example, an industrial application, an energy application, a power plant, a pumping set, a marine application (for example, for naval propulsion), a weapon system, a security system, a perimeter defense or security system.

The leading edge 106 may be the forward most edge disposed at the front of the endwall assembly 100. The endwall assembly 10 is designed to have a fluid flow 122, such as a flow of hot gases exiting a combustor of a gas turbine engine, flow around the endwall assembly 100. The front of the endwall assembly 100 may be considered the side of the endwall assembly 100 facing into the fluid flow 122. Alternatively, or additionally, the leading edge 106 may be the most upstream edge of the endwall assembly 100. Upstream refers to a direction opposite of the direction of the fluid flow 122. The trailing edge 108 may be at the back of the endwall assembly 100. The back of the endwall assembly 100 may be the side of the endwall assembly 100 opposite of the front and/or opposite of the leading edge 106 of the endwall assembly 100. The trailing edge 108 may be the most downstream edge of the endwall assembly 100. Downstream refers to the direction of the fluid flow 122. The leading edge 106 may be opposite the trailing edge 108. An axis 124 may extend along the endwall assembly 100 from the leading edge 106 to the trailing edge 108, perpendicular to the leading edge 106 and/or the trailing edge 108.

The endwall spar 102 may form an inner structure of the endwall assembly 100. For example, the endwall spar 102 may form an inner structure of the cooling fluid channels 120 opposite the coversheet 104, for example, a surface of the cooling fluid channel 120 disposed between the cooling fluid source cavity 118 and the cooling fluid channel 120. Alternatively or additionally, the endwall spar 102 may form at least part of one or more of the cooling fluid source cavities 118 of the endwall assembly 100. The endwall spar 102 may form one or more blocking structures 114 may separate multiple cooling fluid source cavities 118. Additionally or alternatively, the blocking structures 114 may block a flow of cooling fluid from a cooling fluid cavity from a cooling fluid inlet 200 (shown in FIG. 2) or cooling fluid outlet 116.

The endwall spar 102 may be any structure that forms at least a portion of a radially inner and/or radially outer surface of an airfoil ring, for example, a ring of blades or vanes of an turbine engine. The endwall spar 102 may extend along or parallel to an axis, for example the endwall spar 102 may extend parallel to the central axis of a turbine engine, between two components. For example, between a combustor upstream of the endwall assembly 100 and a downstream row of blades or vanes. The endwall spar 102 and/or blocking structure 114 may be composed of any rigid structural material, for example, a metal and/or a composite material. The cooling fluid source cavity 118 may extend along the endwall spar 102 and/or blocking structure 114.

The endwall spar 102 may include a single blocking structure 114 or multiple blocking structures 114. The blocking structure 114 may be made of the same or different material as the endwall spar 102. The blocking structure 114 may be any structure or formation extending away from a surface, for example the upper or lower surface, or the endwall spar 102. The blocking structure 114 may be, for example, a flange extending across the width of the endwall assembly 100, extending between the sidewalls 110 of the endwall spar 102 and disposed between the leading edge 106 and the trailing edge 108. The blocking structure 114 may extend substantially parallel to the leading edge 106 and the trailing edge 108, or at an angle. The blocking structure 114 The cooling fluid source cavities 118 may be divided by the blocking structures 114, for example, a blocking structure 114 may divide an upstream cooling fluid source cavity 118 disposed closer to the front of the endwall assembly 100 from a downstream cooling fluid source cavity 118 disposed closer to the back of the endwall assembly 100. One of the upstream cooling fluid source cavities 118, for example, the upstream cooling fluid source cavity 118, may contain cooling fluid at a higher pressure than the cooling fluid of a downstream cooling fluid source cavity 118. The upstream cooling fluid source cavity 118 may provide cooling fluid at a higher pressure to a cooling fluid channel 120 that cooling fluid provided by a downstream cooling fluid source cavity 118. The higher pressure cooling fluid, for example, air bled from an upstream compressor, may be provided to the upstream cooling fluid source cavity 118, for example, from a point closer to the end of the compressor. Lower pressure bleed air provided to a downstream cooling fluid source cavity 118 may be bled from a point earlier in the compressor.

Additionally or alternatively, the blocking structure 114 may be a flange that extends around the circumference of the airfoil openings 112 either between the coversheet 104 and endwall spar 102, or below the endwall spar 102 near a cooling fluid source cavity 118. The dual-wall structure of the endwall assembly 100 allows for cooling fluid outlets 116 to be placed at optimum areas of the coversheet 104 without worrying about the blocking structure 114 cutting off their location from an ideal cooling fluid source. The cooling fluid outlets 116, for example, may be placed strategically around the endwall assembly 100 in order to dilute the local temperature of the free stream 122 coming off of the combustor in order for the stream of hot fluid 122 to be at a temperature capable of being endured by the airfoil installed in the endwall assembly 100.

The coversheet 104 may form an hot wall of the endwall assembly 100. The coversheet 104 may surround, encompass, and/or be disposed on the endwall spar 102 between the endwall spar 102 and a flow of hot fluid 122. The cooling fluid channel 120 may be disposed in between the endwall spar 102 and the coversheet 104.

A plurality of cooling fluid channels 120 may be disposed between a hot side of the endwall spar 102 and a cold side of the coversheet 104, for example, a side of the coversheet 104 disposed farthest away from the main flow 122 of hot gas. The cooling fluid channels 120 may be any type of passage extending through the endwall assembly 100 capable to directing a cooling fluid from a cooling fluid inlet 200 to a cooling fluid outlet 116. Each cooling fluid channel 120 may include a cooling fluid inlet 200 and/or a cooling fluid outlet 116. The cooling fluid inlet 200 may connect the cooling fluid channel 120 to a cooling fluid source cavity 118 via a cooling fluid inlet 200 so that the cooling fluid channel 120 and the cooling fluid source cavity 118 are in fluid communication. The cooling fluid outlet 116 may connect the cooling fluid channel 120 to a flow of fluid 122 external to the endwall assembly 100 so that the cooling fluid channel 120 is in fluid communication with a fluid flowing over and/or around the endwall assembly 100 and/or the hot side of the coversheet 104.

The cooling fluid channel 120 (shown in FIG. 2) may be formed by the gap and/or space between the hot side of the endwall spar 102 and the cold side of the coversheet 104. The cooling fluid channel 120 may cool the endwall assembly 100. cooling fluid channel 120 may include a channel formed between the endwall spar 102 and the coversheet 104. The cooling fluid channel 120 may be a dual feed cooling fluid channel, a counter feed cooling fluid channel, and/or a co feed cooling fluid channel. A dual feed cooling fluid may include at least two cooling fluid inlets 200 and at least one cooling fluid outlet 116. The two cooling fluid inlets 200 may be spaced apart from each other along the endwall assembly 100, wherein the cooling fluid inlets 200 are disposed at an opposite ends of the cooling fluid channel 120 and the cooling fluid outlet 116 is disposed between the cooling fluid inlets 200, for example, downstream of one of the cooling fluid inlets 200 and upstream of another one of the cooling fluid inlets 200.

Additionally or alternatively the cooling fluid channels 120 may be a co-feed and/or a counter-feed cooling fluid channel 120. A co-feed cooling fluid channel may have a cooling fluid inlet 200 at an upstream end of the co-feed cooling fluid channel, or the end of the co-feed cooling fluid channel closest to the leading edge 106 of the endwall assembly 100. A co-feed circuit may have a cooling fluid outlet 116 at a downstream end of the co-feed cooling fluid channel, or the end of the co feed cooling fluid channel closest to the trailing edge 108 of the endwall assembly 100. A counter-feed cooling fluid channel may have a cooling fluid inlet 200 at downstream end of the counter-feed cooling fluid channel, or the end of the counter-feed cooling fluid channel closest to the trailing edge 108 of the endwall assembly 100. A counter-feed cooling fluid channel may have a cooling fluid outlet 116 at an upstream end of the counter-feed cooling fluid channel, or the end of the counter-feed cooling fluid channel closest to the leading edge 106 of the endwall assembly 100. The endwall assembly 100 may include one or more dual feed cooling fluid channel, co-feed cooling fluid channel, and/or co-flow cooling fluid channel between the endwall spar 102 and the coversheet 104.

The cooling fluid inlets 200 may be any sort of aperture in the endwall spar 102, extending through the endwall spar 102 wall from a cooling fluid source cavity 118 to a cooling fluid channel 120. The cooling fluid inlets 200 may be, for example, a through-hole formed via machining or casting. The cooling fluid inlets 200 may be perpendicular to the endwall spar 102 surface, or may be formed at an acute or obtuse angle with the endwall spar 102 surface. The cooling fluid outlets 116 may be any sort of aperture in the coversheet 104, extending through the coversheet 104 from the cooling fluid channel 120 and past the hot side of the coversheet 104 and/or endwall assembly 100. The cooling fluid outlets 116 may, for example, be film holes formed at an angle with the coversheet 104 to direct cooling fluid in a film over the hot side of the coversheet 104 and/or endwall assembly 100 downstream from the cooling fluid outlet 116. The cooling fluid outlet 116 may be formed at an angle with the coversheet 104 that may not be possible with a single-wall endwall assembly because a flange or blocking structure may dictate the angle of the outlet, whereas in the embodiment shown in FIG. 1, the outlet 116 connects to the cooling fluid channel 120 as opposed to directly to a cooling fluid source on the opposite side of the endwall spar 102. Alternatively or additionally, the cooling fluid outlets 116 may apertures in the endwall spar 102, for example, disposed at the leading edge 106 and/or trailing edge 108 of the endwall. The cooling fluid outlets 116 at the trailing edge 108 and/or the leading edge 106 of the endwall spar 102 may, for example, be film holes. Alternatively or additionally, the cooling fluid outlets 116 at the leading edge 106 may be apertures extending through the endwall spar 102 and shaped such that cooling fluid exiting the cooling fluid outlets 116 impinges on an upstream component, for example, a combustor. Additionally or alternatively, cooling fluid outlets 116 on or near the trialing edge 108 of the endwall assembly 100 may direct cooling fluid onto downstream components, for example, a downstream set of blades or vanes. The cooling fluid inlet 200 and cooling fluid outlet 116 of a cooling fluid channel 120 may be disposed on opposite sides of a blocking structure 114. For example, a cooling fluid inlet 200 may be disposed in the endwall spar 102 upstream of the blocking structure 114 and the cooling fluid outlet 116 may be in the coversheet 104 downstream of the blocking structure 114, or vice versa.

During operation, a cooling fluid may flow from a cooling fluid source cavity 118. The cooling fluid may come from an upstream component of the turbine engine, for example, bypass air from an upstream compressor. The cooling fluid and the fluid flow 122 may be the same fluid that originates from upstream and then is split between a cooling fluid flow and the hot fluid flow 122. For example, during operation, cooling fluid may flow from a cooling fluid source cavity 118 upstream of one of the blocking structures 114, through a cooling fluid inlet 200 upstream of the blocking structure 114, downstream from the cooling fluid inlet 200 through a cooling fluid channel 120, and through a cooling fluid outlet 116 downstream of the cooling fluid inlet 200 and blocking structure 114.

Figure 2:
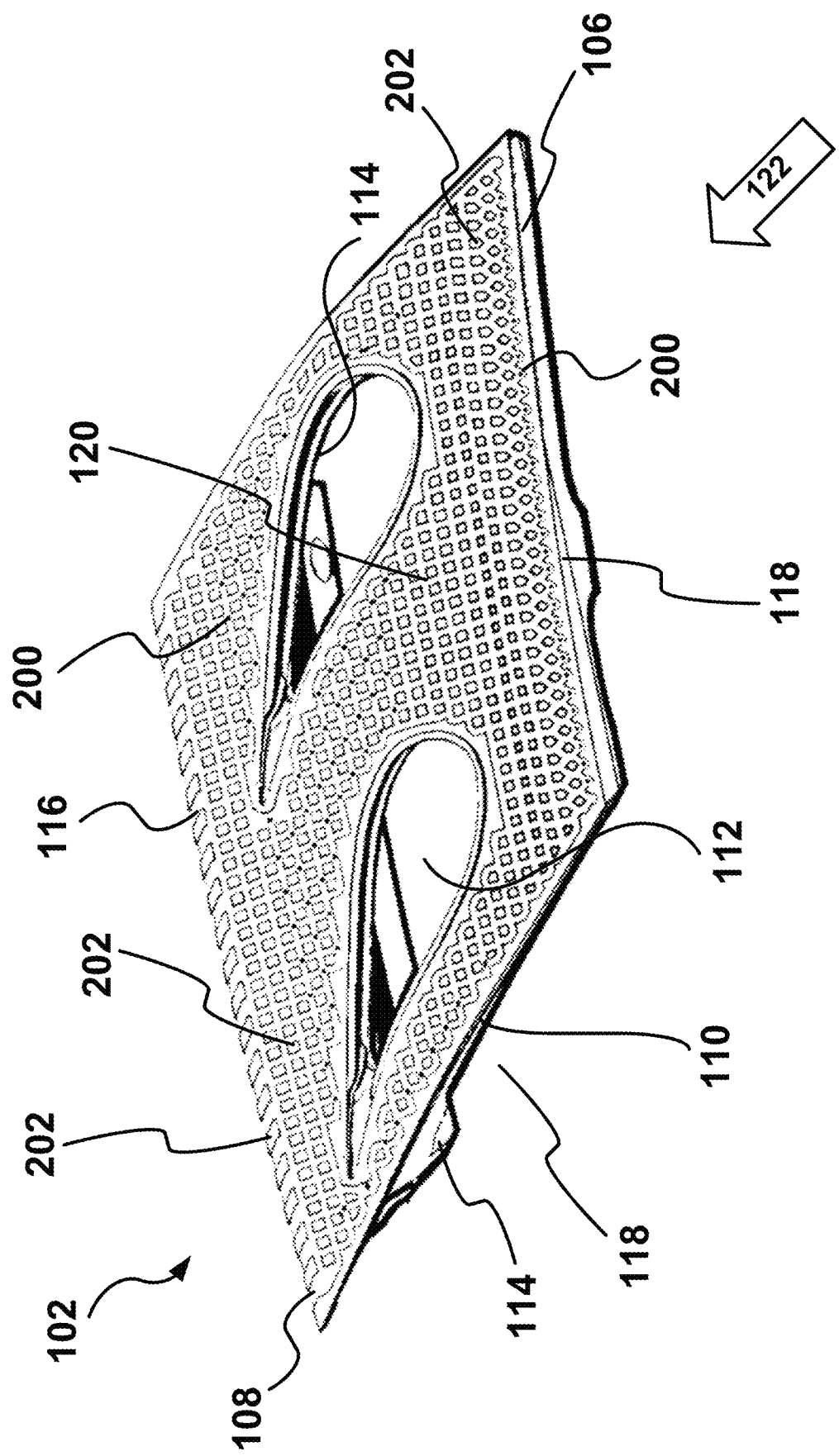
FIG. 2 illustrates an example of an airfoil endwall with the coversheet removed.

FIG. 2 illustrates an example of an endwall spar 102 of the endwall assembly 100. The endwall spar 102 may comprise the airfoil openings, cooling fluid channels 120, the blocking structures 114, cooling fluid inlets 200, and pedestals 210.

The cooling fluid inlets 200 may connect the cooling fluid source cavity 118 to the cooling fluid channel 120. Different cooling fluid inlets 200 may connect different cooling fluid source cavities 118 to the same cooling fluid channel 120 and/or to different cooling fluid channels 120. The cooling fluid inlets 200 may be disposed near and/or immediately adjacent to the leading edge 106 of the endwall spar 102. Additionally or alternatively, the cooling fluid inlets 200 may be disposed at any point on the endwall spar 102 between the leading edge 106 and the trailing edge 108 of the endwall spar 102. The cooling fluid inlets 200 may be disposed between pedestals 202. The endwall spar 102 may comprise cooling fluid channels 120 forming a network of connected cooling fluid channels 120 and pedestals 202, with multiple cooling fluid inlets 200 feeding the connected cooling fluid channels 120. Additionally or alternatively, the endwall spar 102 may comprise the cooling fluid channels 120 that are separate from each other, with one or more cooling fluid inlets 200 feeding separate cooling fluid channels 120.

The pedestals 202 may extend away from the endwall spar 102 towards the coversheet 104. The pedestals 202 may, for example, be rectangular, diamond, and/or hexagonal in shape. The pedestals 202 may help increase cooling by increasing the surface area of the endwall spar 102 that the cooling fluid flow over. The pedestals 202 made be made of the same material as the endwall spar 102. The plurality of pedestals 202 may form a patter on the endwall spar 102. The pedestals 202 may be disposed anywhere on the endwall spar 102 between the leading edge 106 and the trialing edge 108 of the endwall spar 102. Pedestals 202 may, for example, be disposed on or near the trailing edge 108 and form outlets 116 between the pedestals 202.

During operation, cooling fluid may flow from cooling fluid source cavities 118 to the cooling fluid channels 120 via the cooling fluid inlets 200. The cooling fluid may flow through the cooling fluid channels 120, around the pedestals 202, and out the cooling fluid outlet 116. The cooling fluid may flow out the cooling fluid outlets 116 and over the hot side of the coversheet 104. Additionally or alternatively, cooling fluid may exit cooling fluid outlets 116 at the leading edge 106 and/or trailing edge 108 of the endwall spar 102 and impinge on components upstream or downstream of the endwall assembly 100.

Figure 3:
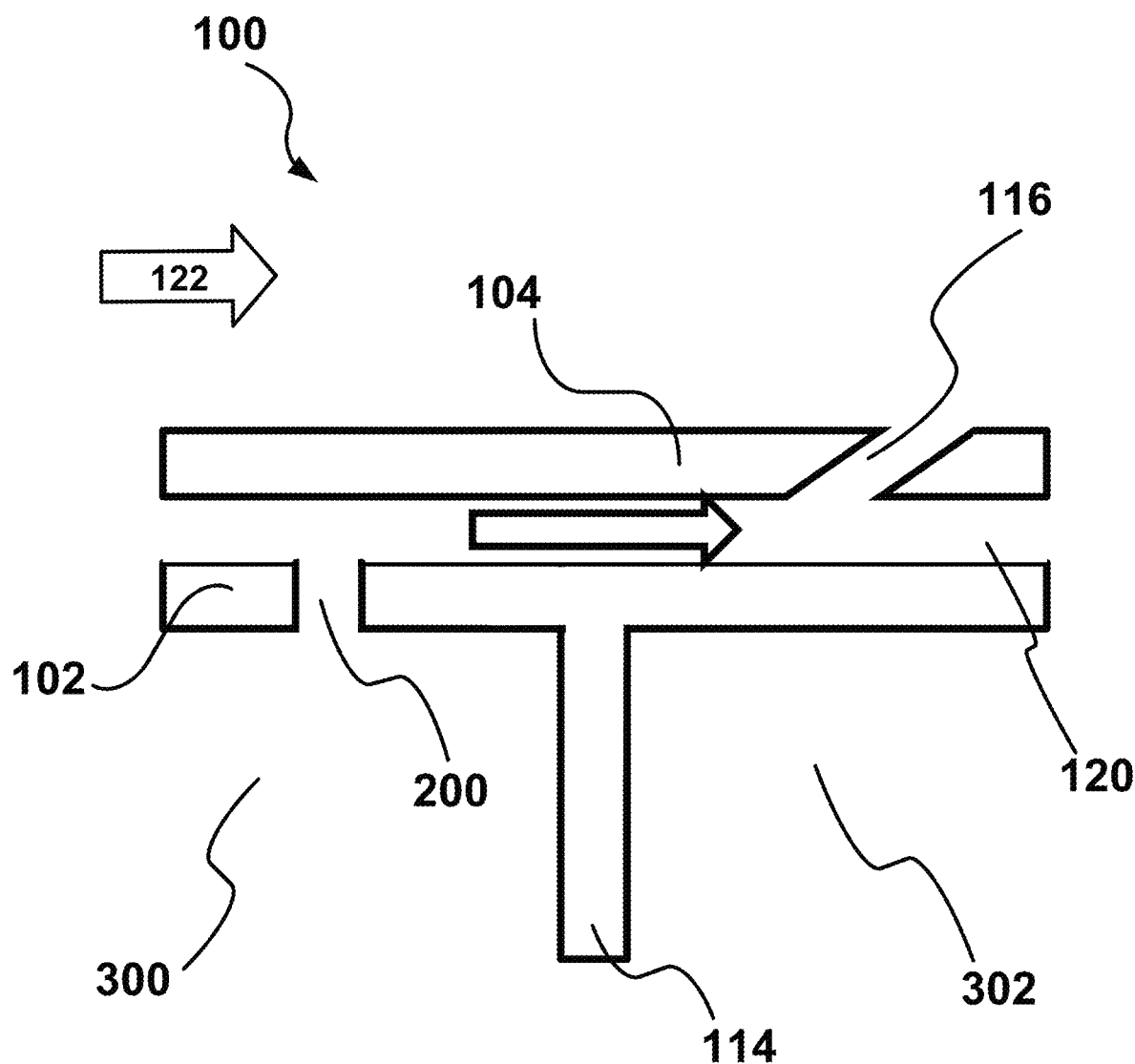
FIG. 3 illustrates an example of a cross section of a portion of an airfoil endwall.

FIG. 3 illustrates an example of a cross section of a portion of the endwall assembly 100. Cooling fluid source cavities 118 may include cooling fluid source cavities that are upstream and downstream of each other. For example, upstream cooling fluid source cavity 300 may be upstream, or closing the leading edge 106 of the endwall spar 102, than downstream cooling fluid source cavity 302. The cooling fluid in cooling fluid source cavity 300 may be at a higher pressure that the cooling fluid in cooling fluid source cavity 302. Additionally or alternatively, the downstream cooling fluid source cavity 302 may not contain any cooling fluid and/or may be a source of less desirable cooling fluid, for example, relatively lower pressure and/or highly swirled fluid. The blocking structure 114, for example, a flange, may extend between and separate the upstream cooling fluid source cavity 300 from the downstream cooling fluid source cavity 302. A cooling fluid outlet 116 may be disposed in the coversheet 104 directly above the area of the downstream cooling fluid source cavity 302, for example, between the downstream cooling fluid source cavity 302 and the hot side of the coversheet 104. A cooling fluid inlet 200 may be disposed in the endwall spar 102 in the area of the upstream cooling fluid source cavity 300 and may connect a cooling fluid channel 120 to the upstream cooling fluid source cavity 300. The cooling fluid channel 120 may connect the upstream cooling fluid source cavity 118 to the cooling fluid outlet 116 disposed above the downstream cooling fluid source cavity 302.

During operation, cooling fluid may flow from the upstream cooling fluid source cavity 300, through the cooling fluid inlet 200 disposed directly above the upstream cooling fluid source cavity 300, through the cooling fluid channel 120, and out the cooling fluid outlet 116.

FIG. 4 illustrates an example of a cooling fluid channel 120 of an endwall assembly 100. FIG. 4 may illustrate only a portion of the whole endwall assembly 100. The endwall spar 102 may comprise a row of cooling fluid inlets 200 and a plurality of diamond pedestals 202, and the coversheet 104 may comprise a row of cooling fluid outlets 116. The row of cooling fluid inlets 200 may provide cooling fluid from a cooling fluid source cavity 118 to the same connected network of cooling fluid channels 120. The cooling fluid inlets 200 and/or the cooling fluid outlets 116 may each be disposed in a respective single row. The row of cooling fluid inlets 200 and/or the row of cooling fluid outlets 116 may be parallel with the leading edge 106 and/or the trailing edge 108 of the endwall spar 102. Additionally or alternatively, the cooling fluid inlets 200 and/or the cooling fluid outlets 116 may each be disposed in multiple parallel rows, the holes of each row may be staggered with the adjacent rows. During operation, cooling fluid may flow from the cooling fluid source cavity 118, through the plurality of cooling fluid inlets 200, through the cooling fluid channels 120 and between the pedestals 202, through the cooling fluid outlets 116, and flow over the coversheet 104 downstream of the cooling fluid outlets 116.

FIG. 5 illustrates examples of cooling fluid channels 120 of an endwall assembly 100 with the coversheet 104 removed. The ratio of cooling fluid inlets 200 to cooling fluid outlets may vary. For example, a cooling fluid channel 120 may have a ratio of one cooling fluid inlet 200 to one cooling fluid outlet 116, as shown in FIGS. 5A-5B. Additionally or alternatively, a cooling fluid channel 120 may have a greater number of cooling fluid inlets 200 then cooling fluid outlets 116, as shown in FIG. 5C. There may be one or more pedestals 202, or rows of pedestals 202, disposed between the cooling fluid inlets 200 and the cooling fluid outlets 116. An endwall spar 102 may comprise a single, large, connected network of cooling fluid channels 120. The cooling fluid channel 120 may extend from the leading edge 106 to the trailing edge 108 of the endwall spar 102 and from sidewall to sidewall 110, coving the upper side of the endwall spar 102. Alternatively or additionally, the endwall spar 102 may comprise a number of separated, smaller cooling fluid channels 120, where each cooling fluid channel 120 only covers a portion of the endwall spar 102.

Figure 6:
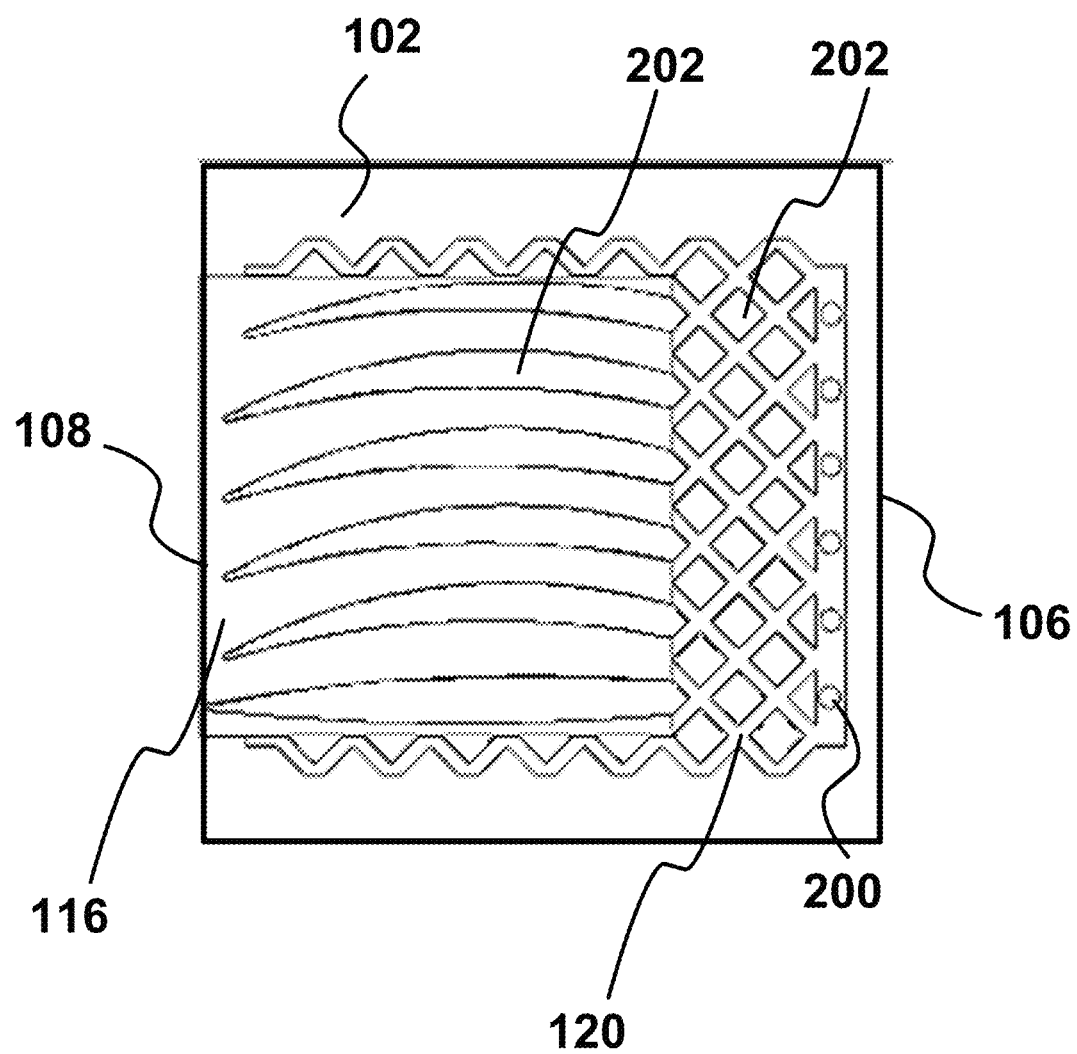
FIG. 6 illustrates an example of a portion of an airfoil endwall.

FIG. 6 illustrates an example of a cooling fluid channel 120 of an endwall assembly 100. The endwall may comprise elongated pedestals 202. The elongated pedestals 202 may, for example, be in the shape of airfoils, with the thicker end of the airfoil shaped pedestal 202 disposed closer to the cooling fluid inlets 200 and the tail of the airfoil shaped pedestals disposed near the cooling fluid outlets 116. The endwall spar 102 may comprise a mix of elongated pedestals 202 and pedestals 202 of other shapes, for example, diamond shaped pedestals 202. The shape of the pedestals 202 may be optimized to eject cooling fluid from the cooling fluid outlets 116 at a specific angle and velocity.

The shape of the pedestals 202 may decrease the pressure drop experienced by the cooling fluid as it flows through the cooling fluid channel 120 as compared to a pressure drop experienced by cooling fluid flowing through a cooling fluid channel 120 with other shaped pedestals, for example, only diamond, square, hexagonal, and/or rectangular pedestals. The pressure of the cooling fluid exiting the cooling fluid outlets 116 may be substantially the same of higher than a pressure of the free stream fluid 122 flowing over the hot side of the coversheet 104 and endwall assembly 100 at the axial location of the cooling fluid outlet 116, which may minimize spoiling losses. During operation, cooling fluid may flow in the cooling fluid inlets 200, over the diamond pedestals 202 and/or elongated pedestals 202, and out cooling fluid outlets 116.

Figure 7:
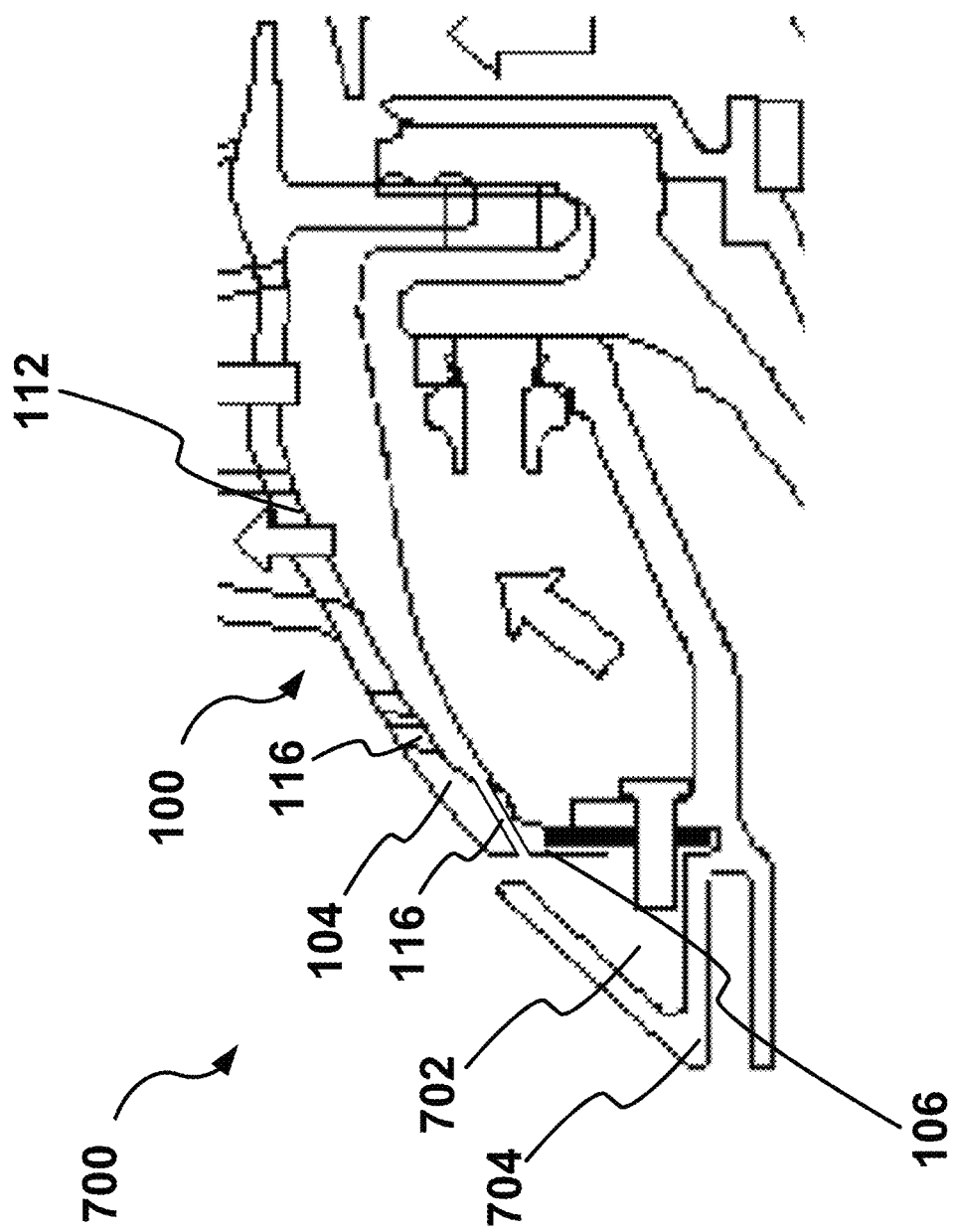
FIG. 7 illustrates an example of a cross section of an airfoil endwall in a turbine engine.

FIG. 7 illustrates an example of portion of a turbine engine 700 comprising the endwall assembly 100 and a combustor 704. The endwall assembly 100 may comprise a portion of a blade or vane ring disposed immediately adjacent to an upstream combustor 704. FIG. 7 may only show a portion of the combustor 704. A cooling fluid chamber 702 may be formed between the endwall assembly 100 and the combustor 704. Cooling fluid outlets 116 may be disposed in the leading edge 106 of the endwall assembly 100. The cooling fluid outlets 116 may be a plurality of apertures, for example, circular apertures, film cooling holes, and/or slots. Additionally or alternatively, the cooling fluid outlet 116 may be a single cooling fluid outlet 116, for example, a slot, extending the width of the leading edge 106. The cooling fluid outlets 116 may direct cooling fluid into the cooling fluid chamber 702. The cooling fluid outlets 116 may be at a precise angle in order to match the exiting cooling fluid with the angle of flow coming off the combustor 704. During operation, cooling fluid may be directed through cooling fluid channels 120 and out the cooling fluid outlets 116 disposed on the leading edge 106 of the endwall assembly 100. The cooling fluid may impinge on the combustor 704. Additionally or alternatively, the cooling fluid may collect in the cooling fluid chamber 702. The impinging cooling fluid and the cooling fluid in the cooling fluid chamber 702 may cool the combustor during operation. The cooling fluid may exit the cooling fluid chamber 702 and flow downstream over the hot side of the endwall assembly, forming a film over the hot side.

Figure 8:
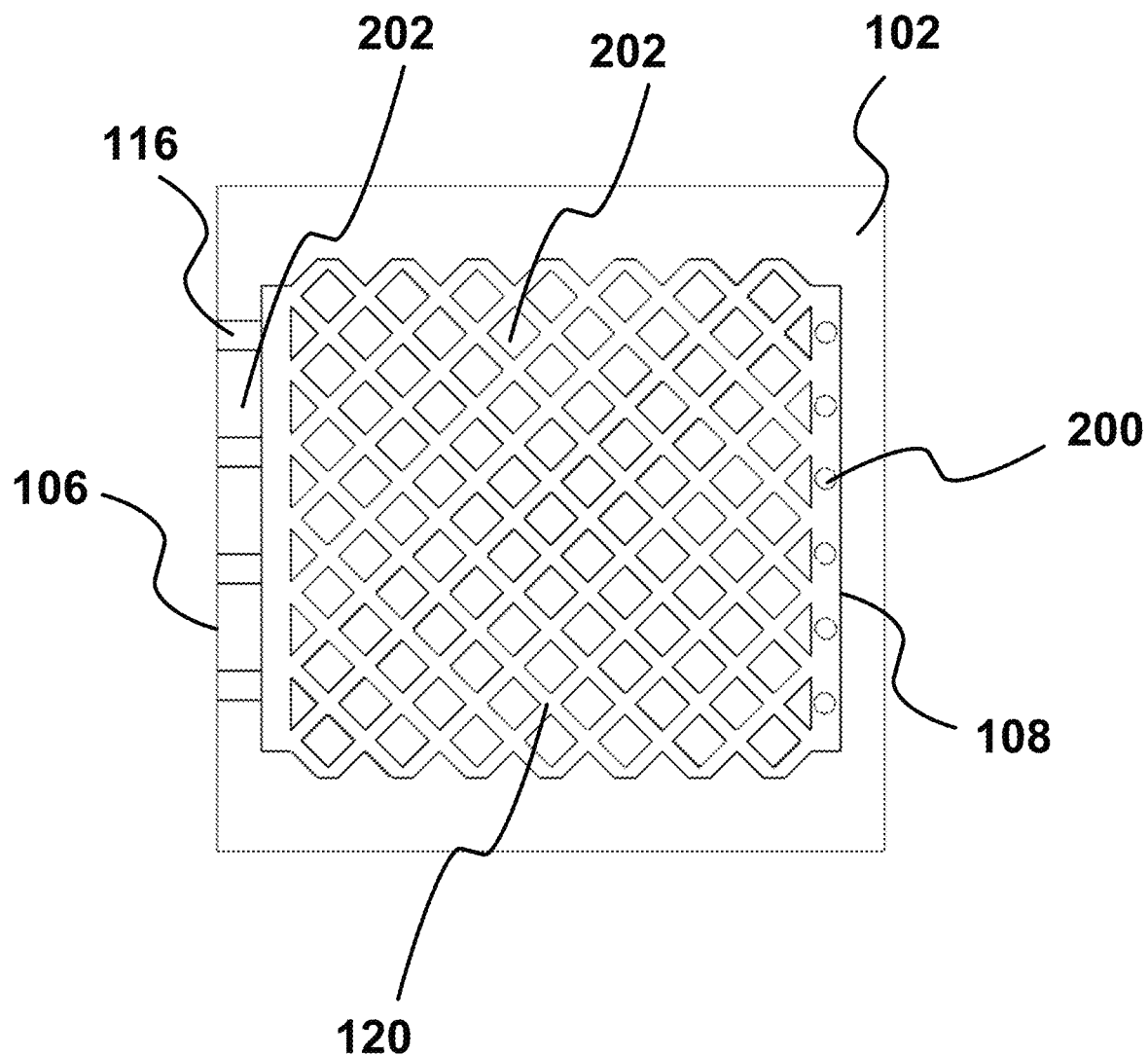
FIG. 8 illustrates an example of a portion of an airfoil endwall.

FIG. 8 illustrates another example of the endwall spar 102. The endwall spar 102 may comprise a network of cooling fluid channels 120 and may have cooling fluid outlets 116 disposed at the leading edge of the endwall spar 102. The cooling fluid outlets 116 may be formed by the gaps in between pedestals 202, wherein the pedestals extend up to the leading edge 106 of the endwall spar 102. The cooling fluid channels 120 may have cooling fluid inlets 200 disposed near the end of the cooling fluid channels 120 closest to the trailing edge 108 of the endwall spar 102, on the opposite end of the cooling fluid channels 120 from the cooling fluid outlets 116.

During operation, cooling fluid may flow from the cooling fluid inlets 200, through the cooling fluid channels 120, between the pedestals 202, and out the cooling fluid outlets 116 at the leading edge 106 of the endwall spar 102. The cooling fluid may flow out the cooling fluid outlets and impinge on a component upstream of the endwall assembly 100 and/or may collect in a cooling fluid chamber 702.

Each component may include additional, different, or fewer components. For example, a cooling fluid channel 120 may include multiple cooling fluid channels 120, a pedestal 202 may include multiple pedestals 202, and cooling fluid inlets 200 and/or cooling fluid outlets 116 may include multiple inlets 200 and/or cooling fluid outlets 116. Additionally or alternatively, the endwall assembly 100 may include multiple endwalls 102 and/or cooling fluid channels 120.

The endwall assembly 100 may be implemented with additional, different, or fewer components. For example, the endwall assembly may be implemented with other components of a turbine engine, for example, blades, vanes, combustors, compressors, and/or turbines. The endwall assembly 100 may be implemented with additional endwall assemblies 100. A turbine engine may comprise multiple endwall assemblies 100. For example, multiple endwall assemblies 100 may be placed sidewall 110 to sidewall 110 to form a continuous ring on endwall assemblies 100. The number and arrangements of cooling fluid channels 120, cooling fluid inlets 200, and/or cooling fluid outlets may vary circumferentially from endwall assembly 100 to endwall assembly 100 around the ring in order to optimize cooling at hot spots around the ring of airfoils.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to an endwall assembly, the endwall assembly disposed at one end of a vane assembly, the endwall assembly comprising: an endwall spar, the endwall spar including a cold side, a hot side, a leading edge, a trailing edge, and an axis extending from the leading edge to the trailing edge; a coversheet on the hot side of the endwall spar; a cooling fluid channel between the hot side of the endwall spar and the coversheet, the cooling fluid channel including a cooling fluid inlet disposed in the endwall spar, and a cooling fluid outlet; a structure protruding from the cold side of the endwall spar, wherein the structure is located between the cooling fluid inlet and the cooling fluid outlet along the axis; and a cooling fluid source cavity on the cold side of the endwall spar, the cooling fluid source cavity in fluid communication with the cooling fluid channel via the cooling fluid inlet.

A second aspect relates to the endwall assembly of aspect 1, wherein the endwall assembly is an inner endwall assembly, and wherein an outer endwall assembly is disposed at an opposite end of the vane assembly.

A third aspect relates to the endwall assembly of any preceding aspect, wherein the structure is a flange.

A fourth aspect relates to the endwall assembly of any preceding aspect, wherein the flange extends along a width of the vane assembly and is disposed closer to the leading edge of the endwall spar than the trailing edge.

A fifth aspect relates to the endwall assembly of any preceding aspect, wherein the endwall spar further includes an airfoil opening, wherein the flange extends around the airfoil opening.

A sixth aspect relates to the endwall assembly of any preceding aspect, wherein a plurality of pedestals are disposed on the hot side of the endwall spar facing the coversheet, the pedestals located between the cooling fluid inlet and the cooling fluid outlet.

A seventh aspect relates to the endwall assembly of any preceding aspect, wherein the pedestals are airfoil shaped.

An eighth aspect relates to the endwall assembly of any preceding aspect, wherein the pedestals extend to the trailing edge of the endwall spar.

A ninth aspect relates to the endwall assembly of any preceding aspect, wherein the cooling fluid outlet is a film hole disposed in the coversheet.

A tenth aspect relates to the endwall assembly of any preceding aspect, wherein the vane assembly is disposed adjacent to a combustor, wherein a cooling fluid chamber is formed between the combustor and the leading edge of the endwall spar.

A eleventh aspect relates to the endwall assembly of any preceding aspect, wherein a slot is disposed at the leading edge of the endwall spar, between the endwall spar and the coversheet, facing the cooling fluid chamber.

A twelfth aspect relates to the endwall assembly of any preceding aspect, wherein a plurality of pedestals are disposed near the leading edge of the endwall spar, and wherein the slot includes a plurality of slots disposed between the pedestals.

A thirteenth aspect relates to an endwall assembly, the endwall assembly disposed at one end of a vane assembly, the endwall assembly comprising: an endwall spar, the endwall spar including a cold side, a hot side, a leading edge, a trailing edge, and an axis extending from the leading edge to the trailing edge, perpendicular to the leading edge; a coversheet on the hot side of the endwall spar; and a cooling fluid channel between the hot side of the endwall spar and the coversheet, the cooling fluid channel including a cooling fluid inlet disposed in the endwall spar, and a cooling fluid outlet disposed in the leading edge of the endwall spar.

A fourteenth aspect relates to the endwall assembly of any preceding aspect further comprising: a structure protruding from the cold side of the endwall spar, the structure is located between the cooling fluid inlet and the cooling fluid outlet along the axis; and a cooling fluid source cavity on the cold side of the endwall spar, the cooling fluid source cavity in fluid communication with the cooling fluid channel via the cooling fluid inlet.

A fifteenth aspect relates to the endwall assembly of any preceding aspect, wherein the endwall assembly further comprises a plurality of pedestals disposed on the hot side of the endwall spar.

A sixteenth aspect relates to the endwall assembly of any preceding aspect, wherein the pedestals are shaped such that a drop in pressure of a cooling fluid caused by the pedestals results in the pressure of the cooling fluid at the cooling fluid outlet being the same as, or higher than, a pressure of a free stream fluid flowing over an hot side of the coversheet at the cooling fluid outlet.

A seventeen aspect relates to the endwall assembly of any preceding aspect, wherein the leading edge of the endwall spar is configured to be adjacent a combustor.

An eighteenth aspect relates to the endwall assembly of any preceding aspect, wherein the cooling fluid outlets are disposed on the leading edge of the endwall spar, the cooling fluid outlets positioned at an angle with the endwall spar matching the angle of a flow of free stream flowing from the combustor.

A nineteenth aspect relates to the endwall assembly of any preceding aspect, wherein the cooling fluid outlets are film cooling holes.

A twentieth aspect relates to an endwall assembly, the endwall assembly disposed at one end of a vane assembly, the endwall assembly comprising: an endwall spar, the endwall spar including a cold side, a hot side, a leading edge, a trailing edge, and an axis extending from the leading edge to the trailing edge, perpendicular to the leading edge; a coversheet on the hot side of the endwall spar; a cooling fluid channel between the hot side of the endwall spar and the coversheet, the cooling fluid channel including a cooling fluid inlet disposed in the endwall spar, and a cooling fluid outlet disposed at the trailing edge of the endwall spar, the cooling fluid outlet disposed downstream from the cooling fluid inlet; a structure protruding from the cold side of the endwall spar, wherein the structure is located between the cooling fluid inlet and the cooling fluid outlet along the axis; and a cooling fluid source cavity on the cold side of the endwall spar, the cooling fluid source cavity in fluid communication with the cooling fluid channel via the cooling fluid inlet.

In addition to the features mentioned in each of the independent aspects enumerated above, some examples may show, alone or in combination, the optional features mentioned in the dependent aspects and/or as disclosed in the description above and shown in the figures.

What is claimed is:

1. An endwall assembly, the endwall assembly disposed at one end of a vane assembly, the endwall assembly comprising:
    an endwall spar, the endwall spar including
        a cold side,
        a hot side,
        a leading edge,
        a trailing edge, and
        an axis extending from the leading edge to the trailing edge;
    a coversheet on the hot side of the endwall spar;
    a cooling fluid channel between the hot side of the endwall spar and the coversheet, the cooling fluid channel including
        a cooling fluid inlet disposed in the endwall spar, and
        a cooling fluid outlet;

a structure protruding from the cold side of the endwall spar, wherein the structure is located between the cooling fluid inlet and the cooling fluid outlet along the axis; and a cooling fluid source cavity on the cold side of the endwall spar, the cooling fluid source cavity in fluid communication with the cooling fluid channel via the cooling fluid inlet.

2. The endwall assembly of claim 1 wherein the endwall assembly is an inner endwall assembly, and wherein an outer endwall assembly is disposed at an opposite end of the vane assembly.

3. The endwall assembly of claim 1 wherein the structure is a flange.

4. The endwall assembly of claim 3 wherein the flange extends along a width of the vane assembly and is disposed closer to the leading edge of the endwall spar than the trailing edge.

5. The endwall assembly of claim 3 wherein the endwall spar further includes an airfoil opening, wherein the flange extends around the airfoil opening.

6. The endwall assembly of claim 1 wherein a plurality of pedestals are disposed on the hot side of the endwall spar facing the coversheet, the pedestals located between the cooling fluid inlet and the cooling fluid outlet.

7. The endwall assembly of claim 6 wherein the pedestals are airfoil shaped.

8. The endwall assembly of claim 7 wherein the pedestals extend to the trailing edge of the endwall spar.

9. The endwall assembly of claim 1 wherein the cooling fluid outlet is a film hole disposed in the coversheet.

10. The endwall assembly of claim 1, wherein the vane assembly is disposed adjacent to a combustor, wherein a cooling fluid chamber is formed between the combustor and the leading edge of the endwall spar.

11. The endwall assembly of claim 10 wherein a slot is disposed at the leading edge of the endwall spar, between the endwall spar and the coversheet, facing the cooling fluid chamber.

12. The endwall assembly of claim 11 wherein a plurality of pedestals are disposed near the leading edge of the endwall spar, and wherein the slot includes a plurality of slots disposed between the pedestals.

13. An endwall assembly, the endwall assembly disposed at one end of a vane assembly, the endwall assembly comprising:

an endwall spar, the endwall spar including
a cold side,
a hot side,
a leading edge,
a trailing edge, and
an axis extending from the leading edge to the trailing edge,
perpendicular to the leading edge;
a coversheet on the hot side of the endwall spar; and
a cooling fluid channel between the hot side of the endwall spar and the coversheet, the cooling fluid channel including a cooling fluid inlet disposed in the endwall spar, and
a cooling fluid outlet disposed in the leading edge of the endwall spar.

14. The endwall assembly of claim 13 further comprising:
a structure protruding from the cold side of the endwall spar, the structure is located between the cooling fluid inlet and the cooling fluid outlet along the axis; and
a cooling fluid source cavity on the cold side of the endwall spar, the cooling fluid source cavity in fluid communication with the cooling fluid channel via the cooling fluid inlet.

15. The endwall assembly of claim 13 wherein the endwall assembly further comprises a plurality of pedestals disposed on the hot side of the endwall spar.

16. The endwall assembly of claim 15 wherein the pedestals are shaped such that a drop in pressure of a cooling fluid caused by the pedestals results in the pressure of the cooling fluid at the cooling fluid outlet being the same as, or higher than, a pressure of a free stream fluid flowing over an hot side of the coversheet at the cooling fluid outlet.

17. The endwall assembly of claim 16 wherein the cooling fluid outlets are film cooling holes.

18. The endwall assembly of claim 13 wherein the leading edge of the endwall spar is configured to be adjacent a combustor.

19. The endwall assembly of claim 18 wherein the cooling fluid outlets are disposed on the leading edge of the endwall spar, the cooling fluid outlets positioned at an angle with the endwall spar matching the angle of a flow of free stream flowing from the combustor.

20. An endwall assembly, the endwall assembly disposed at one end of a vane assembly, the endwall assembly comprising:

an endwall spar, the endwall spar including
a cold side,
a hot side,
a leading edge,
a trailing edge, and
an axis extending from the leading edge to the trailing edge,
perpendicular to the leading edge;
a coversheet on the hot side of the endwall spar;
a cooling fluid channel between the hot side of the endwall spar and the coversheet, the cooling fluid channel including
a cooling fluid inlet disposed in the endwall spar, and
a cooling fluid outlet disposed at the trailing edge of the endwall spar, the cooling fluid outlet disposed downstream from the cooling fluid inlet;
a structure protruding from the cold side of the endwall spar, wherein the structure is located between the cooling fluid inlet and the cooling fluid outlet along the axis; and
a cooling fluid source cavity on the cold side of the endwall spar, the cooling fluid source cavity in fluid communication with the cooling fluid channel via the cooling fluid inlet.

* * * * *